March 8, 1927.　　　　　　　　　　　　　　　　　　　1,620,521
J. DALGLISH
APPARATUS FOR THE MANUFACTURE OF RUBBER OR THE LIKE TUBES
Filed July 17, 1926
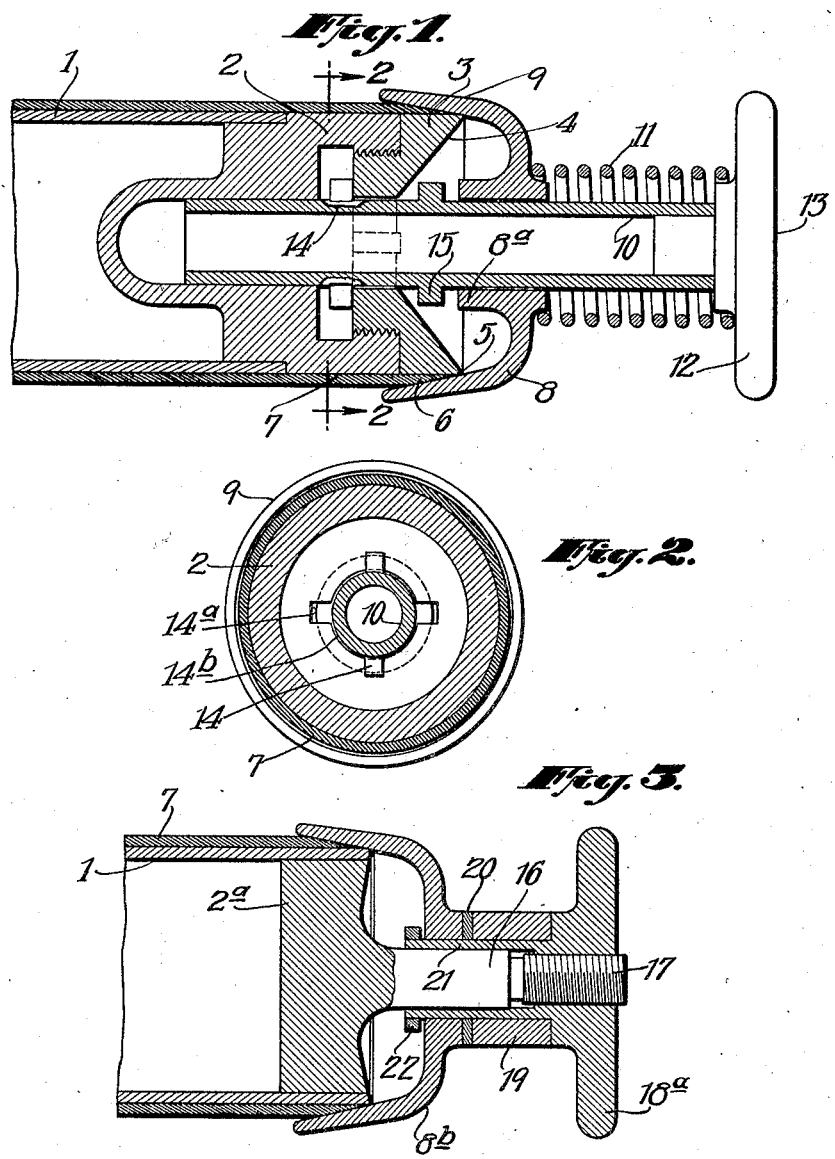
Inventor
JOHN DALGLISH.
By His Attorney Patented Mar. 8, 1927.

1,620,521

UNITED STATES PATENT OFFICE.

JOHN DALGLISH, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

APPARATUS FOR THE MANUFACTURE OF RUBBER OR THE LIKE TUBES.

Application filed July 17, 1926, Serial No. 123,215, and in Great Britain July 18, 1925.

This invention relates to apparatus for use in the manufacture of rubber or the like tubes, wherein improved means are provided for tapering the ends of the tubes during vulcanization before they are jointed together to form a continuous circular tube. While not limited thereto the invention is particularly applicable to the manufacture of the inner tubes of pneumatic tires.

The invention will be apparent from the following specification when read in connection with the accompanying drawings in which—

Fig. 1 is a cross-section showing one form of the device according to this invention;

Fig. 2 is an end view of the same with part of the apparatus sectioned off on line 2—2 of Fig. 1;

Fig. 3 is a cross-section showing another device embodying my invention.

In the embodiment of my invention illustrated in Fig. 1, the mandrel 1 is provided at its end with a reinforcing member 2 which serves the purpose of protecting the end of the mandrel. Rigidly attached to the end of the said reinforcing member 2 is an annular knife-like member 3 which is recessed at 4 to form an edge 5 adapted to sever the exuded rubber from the end of the bevel 6 on the tube 7 occasioned by the reduction of the cross-sectional area thereat. The bevelling member 8 projects over the member 3 in such a manner that its taper 9 embraces the end of the tube 7 so as to cause the same to assume, during vulcanization, the shape of the said taper 9 at the end so embraced. The bevelling member 8 which is slidably mounted on a sleeve 10 is adapted to be forced under pressure over the end of the tube 7 by a compression spring 11 which functions between the said bevelling member and the annular flange 12 of the handle 13 which is rigidly affixed to the end of the sleeve 10. The said sleeve is slidably mounted within the reinforcing member 2 and is adapted to be detachably retained therein by the bayonet joint illustrated at 14 and 14ª in Figs. 1 and 2.

In operation, the tube 7 is arranged upon the mandrel 1 with its end flush with the end of the knife-like member 3. The bevelling means, comprising the sleeve 10, the bevelling member 8, the spring 11 and the handle 13 and which, it is apparent, is separable as a unit from the mandrel with its reinforcing and knife-like members 2 and 3 respectively, is then fitted into position. The projections 14 pass through the slot 14ª on the bore of the member 3 and the device having been rotated one quarter of a revolution engage the face 14ᵇ of the said member. Thus the sleeve 10 is efficiently anchored and the spring 11 is enabled to exert the required pressure between the handle 13 and the bevelling member 8.

To obviate the necessity for compressing the spring wholly from its free position and thus considerably to facilitate the putting of the sleeve into position we provide a flange or projection 15 upon the said sleeve against which an extension 8ª on the bevelling member abuts in such a manner as to retain the spring under a partial initial compression.

In the modification illustrated in Fig. 3, the reinforcing member 2ª is provided with an integral extension 16 which is screw threaded at its end 17 to engage a hand wheel 18 which is adapted to propel the bevelling member 8ᵇ into the required position over the end of the tube 7. It is considered desirable that the pressure exerted should be characterized by a certain resiliency to allow the bevelling member to accommodate any displacement of the rubber of the tube about the bevel thereof and I therefore, provide that the hand wheel 18ª shall exert its pressure through a rubber bush 19 substantially similar in this function to the spring 11. A washer 20 is provided between the bevelling member and the said bush to prevent undue abrasion of the rubber at that juncture. The hand wheel 18ª is formed with a sleeve-like extension 21 to which is rigidly attached a flange 22 which is adapted to withdraw the bevelling member 8ᵇ when vulcanization of the tube is complete.

Though I have described quite specifically the embodiments of the invention illustrated, it is not to be construed that I am limited thereto since various modifications and substitution of equivalents may be made by those skilled in the art without departing from the invention as defined in the appended claims.

What I claim is:—

1. An apparatus for use in manufacturing rubber tubes including a mandrel adapted to support the end of the tube, an annular knife having a beveled cutting edge carried by said mandrel, an annular member adapted to coact with said knife, means secured to the mandrel for slidingly supporting said annular member.

2. An apparatus for use in manufacturing rubber tubes including a mandrel adapted to support the end of the tube, an annular knife having a beveled cutting edge carried by said mandrel, an annular member adapted to coact with said knife, means detachably secured to said mandrel for slidingly supporting said annular member.

3. An apparatus for use in manufacturing rubber tubes including a mandrel adapted to support the end of the tube, an annular knife carried by said mandrel, an annular member adapted to coact with said knife, means detachably secured to said mandrel for slidingly supporting said annular member and resilient means for pressing said annular member toward said knife.

4. An apparatus of the class described including in combination a tube supporting mandrel, a member carried by said mandrel adapted to be embraced by the end of an unvulcanized tube, an annular tapered member adapted to skive the end of said unvulcanized tube and means for pressing said annular member into engagement with the end of said tube and means for slidingly supporting said annular tapered member and means detachably secured to said first named member for slidingly supporting said annular member.

5. An apparatus of the class described including in combination a mandrel adapted to support a rubber tube, a reinforcing member secured to the end of said mandrel, an annular knife secured to said reinforcing member, a detachable guide engaging said reinforcing member, an annular skiving member slidable on said guide and means for pressing said skiving member toward said knife.

In witnes whereof, I have hereunto signed my name.

JOHN DALGLISH.